(12) United States Patent
Fujimori et al.

(10) Patent No.: US 10,180,232 B2
(45) Date of Patent: Jan. 15, 2019

(54) OPTICAL MEMBER, LIGHT SOURCE DEVICE, AND IRRADIATION SYSTEM

(71) Applicant: NICHIA CORPORATION, Anan-shi, Tokushima (JP)

(72) Inventors: Hiroshi Fujimori, Chino (JP); Akiyoshi Wakafuji, Chino (JP)

(73) Assignee: NICHIA CORPORATION, Anan-Shi (JP)

( * ) Notice: Subject to any disclaimer, the term of this patent is extended or adjusted under 35 U.S.C. 154(b) by 0 days.

(21) Appl. No.: 15/691,555

(22) Filed: Aug. 30, 2017

(65) Prior Publication Data

US 2018/0058660 A1 Mar. 1, 2018

(30) Foreign Application Priority Data

Aug. 31, 2016 (JP) .................................. 2016-169714
Aug. 25, 2017 (JP) .................................. 2017-162251

(51) Int. Cl.
| | | |
|---|---|---|
| *F21V 31/04* | (2006.01) | |
| *F21V 5/00* | (2018.01) | |
| *G02B 3/00* | (2006.01) | |
| *F21S 8/08* | (2006.01) | |
| *G09F 13/02* | (2006.01) | |
| *F21W 131/103* | (2006.01) | |
| *F21Y 115/10* | (2016.01) | |

(52) U.S. Cl.
CPC .............. *F21V 5/004* (2013.01); *F21S 8/086* (2013.01); *G02B 3/0056* (2013.01); *F21W 2131/103* (2013.01); *F21Y 2115/10* (2016.08); *G02B 2003/0093* (2013.01); *G09F 13/02* (2013.01)

(58) Field of Classification Search
CPC ................. F21V 5/004; G02B 3/0056; G02B 2003/0093; G09F 13/02
USPC .......................................................... 362/253
See application file for complete search history.

(56) References Cited

U.S. PATENT DOCUMENTS

| | | | | |
|---|---|---|---|---|
| 8,016,460 B2 * | 9/2011 | Huang | ............... | G02B 27/0955 |
| | | | | 359/641 |
| 2015/0034978 A1* | 2/2015 | Hussell | ............... | H01L 25/0753 |
| | | | | 257/89 |

FOREIGN PATENT DOCUMENTS

| | | |
|---|---|---|
| JP | H02-239218 A | 9/1990 |
| JP | 2001-083603 A | 3/2001 |
| JP | 2015-162424 A | 9/2015 |

* cited by examiner

*Primary Examiner* — Karl D Frech
(74) *Attorney, Agent, or Firm* — Foley & Lardner LLP

(57) ABSTRACT

An optical member includes one or more lens surfaces, each lens surface comprising a curved surface having: a curvature in a first direction, and a curvature in a second direction that is perpendicular to the first direction in an imaginary plane perpendicular to an optical axis of incident light. Each of the one or more lens surfaces has a substantially rectangular planar shape when viewed in an optical axis direction, the substantially rectangular planar shape being defined by two sides substantially parallel to the first direction and two sides substantially parallel to the second direction. The curvature in the second direction continuously increases from a first end of each of the one or more lens surfaces in the first direction toward a second end of each of the one or more lens surfaces in the first direction.

12 Claims, 7 Drawing Sheets

OPTICAL MEMBER, LIGHT SOURCE DEVICE, AND IRRADIATION SYSTEM

CROSS-REFERENCE TO RELATED APPLICATIONS

The present application claims priority to Japanese Patent Application No. 2016-169714, filed on Aug. 31, 2016, and Japanese Patent Application No. 2017-162251, filed on Aug. 25, 2017, the disclosures of which are hereby incorporated by reference in their entireties.

BACKGROUND OF THE INVENTION

The present disclosure relates to an optical member for irradiating light to a surface to be irradiated, a light source device including the optical member, and an irradiation system including the light source device.

DESCRIPTION OF RELATED ART

Light source devices configured to irradiate light to surfaces to be irradiated are used in illuminating devices for billboards and roads or in projection display devices. Some such light source devices include a fly's-eye lens in which a plurality of lens surfaces are arranged in a matrix to give a rectangular irradiated area on a surface to be irradiated. In addition, a light source device is proposed in which the center of curvature of each of lens surfaces (i.e., cells) constituting a fly's-eye lens is offset from the center in a width direction in order to obtain uniform luminance in the irradiated area in the case of front irradiation (for example, see Japanese Unexamined Patent Application Publication No. 2001-83603).

SUMMARY OF THE INVENTION

In the light source device described in Japanese Unexamined Patent Application Publication No. 2001-83603, with lens surfaces each having the center of curvature offset from the center of respective lens surface in the width direction, surface sagging between the lens surfaces can be prevented and the luminance in the illuminated area can be uniform. However, in the case where light is irradiated on a surface to be irradiated that is inclined with respect to the optical axis of emitted light instead of front irradiation, the irradiated area in the surface does not have a rectangular shape but has a trapezoidal shape in which a side near the light source device is bright while a side far from the light source device is dark, so that the luminance on the surface to be irradiated is not uniform. Accordingly, such a light source device is not suitable for illuminating a surface to be irradiated that is inclined with respect to the optical axis.

Certain embodiments described in this application have been made in view of the above problem. One object of the present disclosure is to provide an optical member that allows for, when light is irradiated to a surface that is inclined with respect to the optical axis of irradiated light, obtaining a rectangular illuminated area with a uniform luminance on the irradiated surface, to provide a light source device including the optical member, and to provide an irradiation system including the light source device.

An optical member according to one embodiment of the present invention includes one or more lens surfaces respectively having a curved surface, the curved surface having a curvature in a first direction (i.e., X axis) and a curvature in a second direction (i.e., Y axis), the second direction being perpendicular to the first direction in an imaginary plane perpendicular to an optical axis (i.e., Z axis) of incident light, in which each of the one or more lens surfaces has a substantially rectangular planar shape when viewed in an optical axis direction, the substantially rectangular planar shape being defined by two sides substantially parallel to the first direction and two sides substantially parallel to the second direction, and the curvature in the second direction continuously increases from a first end of each of the one or more lens surfaces in the first direction toward a second end of each of the one or more lens surfaces in the first direction.

A light source device according to one embodiment of the present invention includes the optical member as described above and a light source for irradiating collimated light to the optical member.

An irradiation system according to one embodiment of the present invention includes the light source device as described above and a surface to be irradiated with light emitted from the light source device, the surface to be irradiated is inclined with respect to an imaginary plane perpendicular to the light emitted from the light source device such that a first end of the surface to be irradiated that is closer to the first end of each of the one or more lens surfaces in the first direction is located closer to the light source device and a second end of the surface to be irradiated that is closer to a second end of each of the one or more lens surfaces in the first direction is located farther from the light source device.

According to certain embodiments as described above, when light is irradiated to a surface inclined with respect to an optical axis of the light, a rectangular illuminated area with a uniform luminance can be obtained on the irradiated surface.

DETAILED DESCRIPTION

Certain embodiments according to the present invention will be described below with reference to the drawings.

Optical Member

Figure 1:
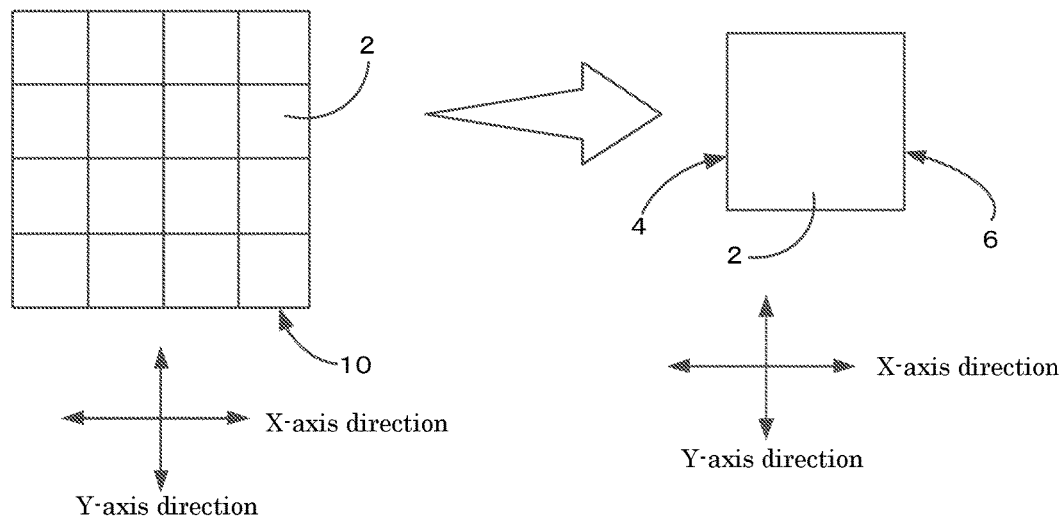
FIG. 1 is a schematic plan view of a fly's-eye lens according to one embodiment of the present invention and one of lens surfaces constituting the fly's-eye lens.
Figure 2:
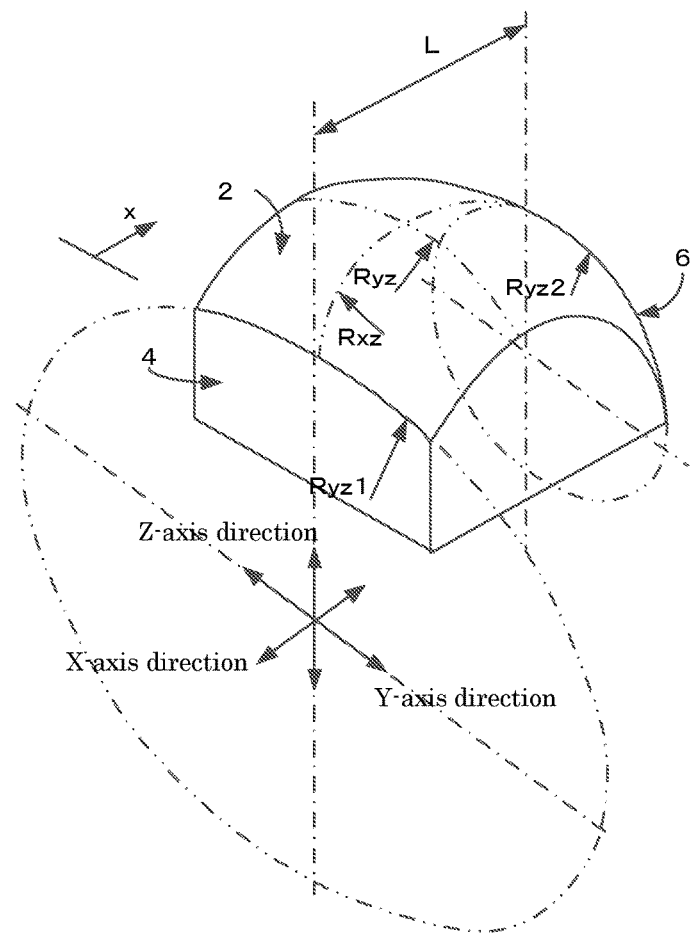
FIG. 2 is a schematic detailed perspective view of the lens surface shown in FIG. 1.

First, an optical member according to one embodiment of the present invention will be described referring to FIG. 1 and FIG. 2. In the description below, an exemplary case is illustrated in which a fly's-eye lens in which a plurality of lens surfaces are arranged in a matrix is used. FIG. 1 is a schematic plan view of a fly's-eye lens 10 according to one embodiment of the present invention and one of lens surfaces 2 constituting the fly's-eye lens 10. FIG. 2 is a schematic detailed perspective view of the lens surface 2 shown in FIG. 1.

In the fly's-eye lens 10 according to the present embodiment, a plurality of lens surfaces 2 are arranged in a matrix as shown in the left side of FIG. 1. The lens surfaces 2 are oriented in the same direction. In the case shown in FIG. 1, all the lens surfaces 2 protrude toward the viewer.

In the right side of FIG. 1, an enlarged view of one of the lens surfaces 2 constituting the fly's-eye lens 10 is provided. The schematic perspective view in FIG. 2 shows a portion having one lens surface 2 cut out from the fly's-eye lens 10.

In each of the drawings, a Z-axis direction refers to a direction of the optical axis of incident light emitted from a light source. Of directions perpendicular to each other in an imaginary plane perpendicular to the optical axis (i.e., the Z-axis direction) of incident light, a first direction is referred to as a X-axis direction, and a second direction is referred to as a Y-axis direction. Light emitted from the light source and light emitted from the fly's-eye lens are schematically illustrated by dotted arrows.

As shown in FIG. 1, when viewed from the optical axis direction, each of the lens surfaces 2 has a substantially rectangular planar shape formed by two sides substantially parallel to the first direction (i.e., X-axis direction) and two sides substantially parallel to the second direction (i.e., Y-axis direction). The expression "rectangular shape" in the present specification includes a square.

As shown in FIG. 2, the lens surface 2 has curvatures in the first direction (X-axis direction) and the second direction (Y-axis direction). The curvature in the second direction (Y-axis direction) continuously increases from a first end 4 of the lens surface in the first direction (X-axis direction) toward a second end 6 of the lens surface in the first direction (X-axis direction). In other words, a radius of curvature Ryz in the second direction (Y-axis direction) continuously decreases from the first end 4 of the lens surface in the first direction (X-axis direction) toward the second end 6 of the lens surface in the first direction (X-axis direction).

That is, the relation $Ryz1 > Ryz > Ryz2$ is satisfied, where Ryz1 is the radius of curvature at the end 4, Ryz2 is the radius of curvature at the second end 6, and Ryz is the radius of curvature at an any position between both ends 4 and 6 in the X-axis direction.

In the present embodiment, the radius of curvature Ryz decreases proportionately with increase in the distance from the first end 4. That is, $Ryz = (Ryz1 - Ryz2)/L \times x$ is satisfied, where L is the distance between the first end 4 and the second end 6, and x is the distance from the first end 4.

Any function in which the distance x from the first end 4 is a variable, which continuously changes, can be used for the value of the radius Ryz of curvature. In this case, the relation can be represented by $Ryz = f(x)$.

Once the radius Ryz ($= f(x)$) of curvature in the second direction (Y-axis direction) at any position in the first direction (X-axis direction) is determined, a radius Rxz of curvature in the first direction (X-axis direction) at any position in the second direction (Y-axis direction) is uniquely determined.

In the present embodiment, a curve that is a portion of an ellipse (i.e., with the radius of curvature Ryz1) is formed in the curvature in the second direction (Y-axis direction) at the first end 4, and a curve that is a portion of a circle (i.e., with the radius of curvature Ryz2) is formed in the curvature in the second direction (Y-axis direction) at the second end 6. Accordingly, a spline curve or a Bézier curve (i.e., with the radius of curvature Rxz) is formed in the curvature in the first direction (X-axis direction).

In this case, the relation $Ryz1 > Rxz > Ryz2$ may be satisfied, where Rxz is the radius of curvature in the first direction (X-axis direction) at any position in the second direction (Y-axis direction).

In the fly's-eye lens 10 shown in FIG. 1, portions having the lens surfaces 2 each shown in FIG. 2 are arranged in a matrix and integrally formed, and accordingly, for example, the portions are integrally formed such that the first end 4 of a portion is in contact with the second end 6 of adjacent portion having the lens surface 2 in the X-axis direction.

In the present embodiment, descriptions are given on the fly's-eye lens 10 in which a plurality of lens surfaces 2 are arranged in a matrix as an example, but any other appropriate member may alternatively be used for the optical member.

For example, an optical member having a single lens surface 2 as shown in FIG. 2 may be used.

Light Source Device

Figure 3:
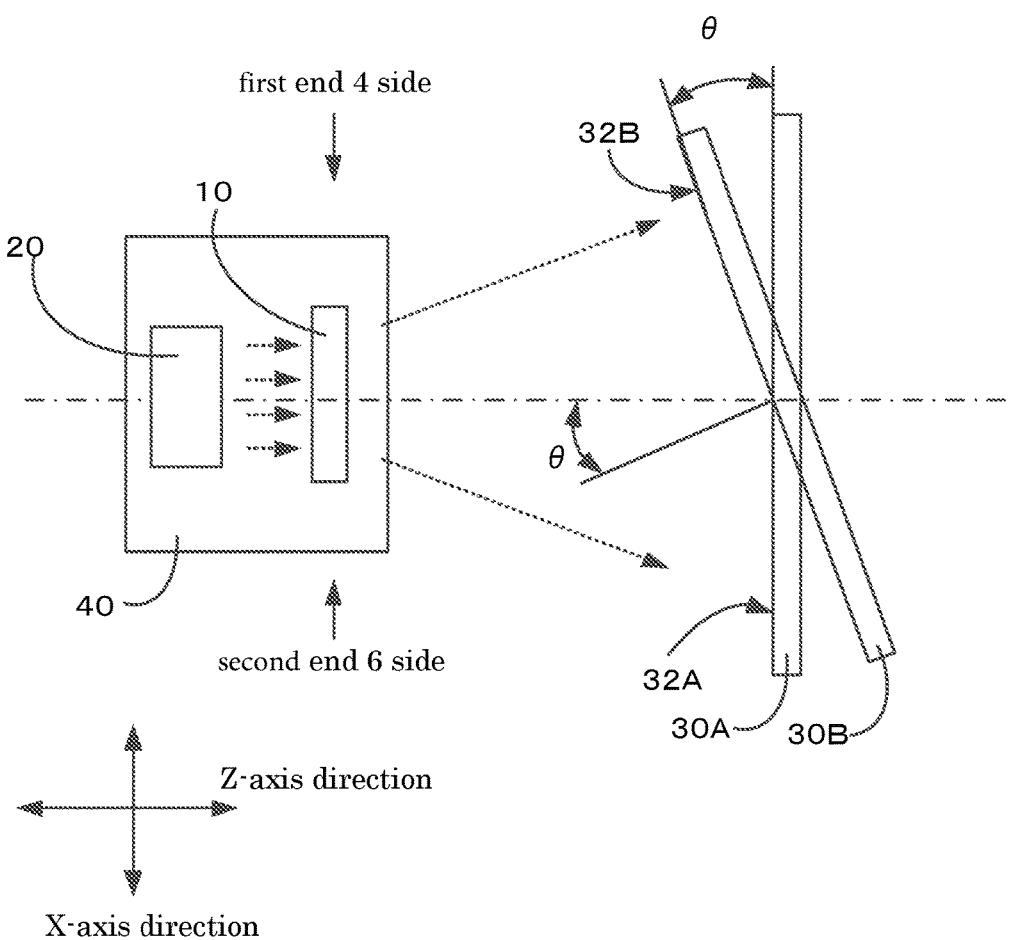
FIG. 3 is a diagram schematically illustrating the case where a light source device including the fly's-eye lens shown in FIG. 1 casts light on surfaces to be irradiated.
Figure 4A:
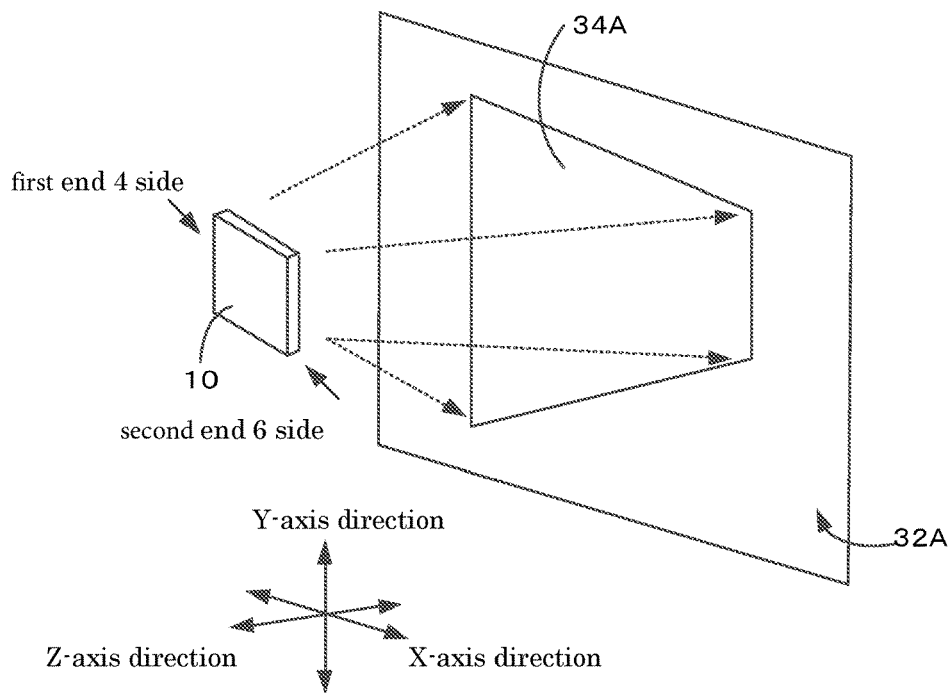
FIG. 4A is a schematic perspective view for illustrating a shape of an illuminated area when light is irradiated from the light source device including the fly's-eye lens shown in FIG. 1 to a surface that is disposed perpendicular to the optical axis of the irradiated light.

A light source device according to one embodiment of the present invention will be described referring to FIG. 3, FIG. 4A, and FIG. 4B. FIG. 3 is a diagram schematically illustrating the case where light is irradiated from a light source device 40 including the fly's-eye lens 10 shown in FIG. 1 on surfaces 32A and 32B to be irradiated. FIG. 4A is a schematic perspective view for illustrating the shape of an illuminated area 34A when light is irradiated from the light source device 40 including the fly's-eye lens 10 shown in FIG. 1 to the surface 32A to be irradiated disposed perpendicular to the optical axis of the light.

Figure 4B:
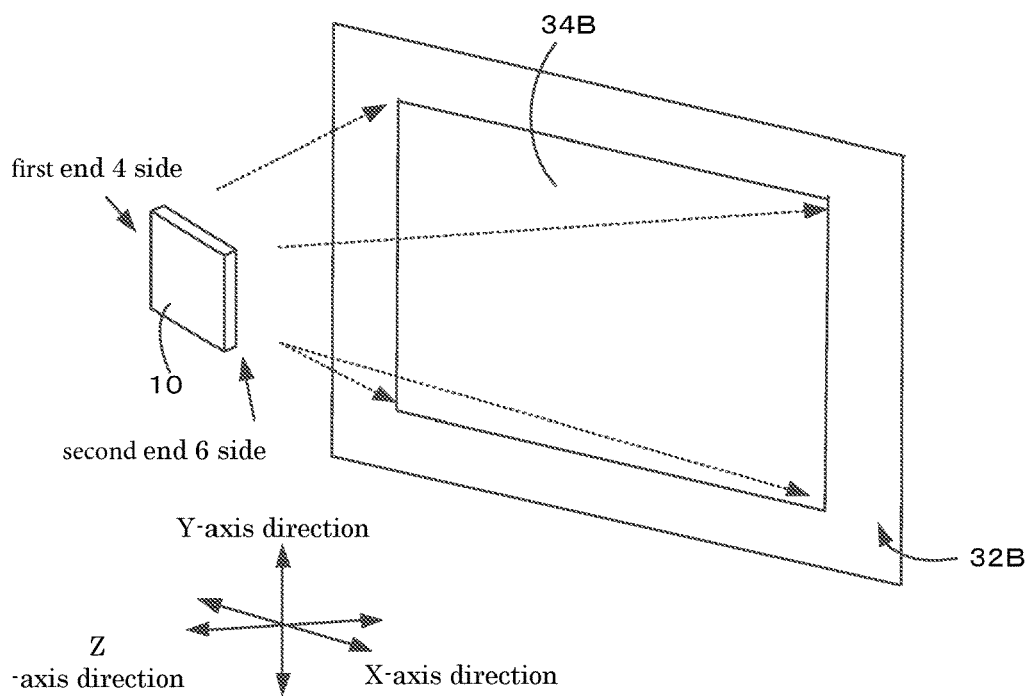
FIG. 4B is a schematic perspective view for illustrating the shape of an illuminated area when light is irradiated from the light source device including the fly's-eye lens shown in FIG. 1 to a surface inclined with respect to the optical axis of the light.

FIG. 4B is a schematic perspective view for illustrating the shape of an illuminated area 34B when light is irradiated on the surface 32B to be irradiated that is inclined with respect to the optical axis of the light. FIG. 4A and FIG. 4B each show only the fly's-eye lens 10 included in the light source device 40 and the surface 32A or 32B to be irradiated.

The light source device 40 according to the present embodiment includes the fly's-eye lens 10 and a light source 20 configured to emit collimated light into the fly's-eye lens 10. Examples of the light source 20 include light-emitting diodes (LEDs). To emit collimated light into the fly's-eye lens 10, it is preferable to use a light source device including a collimating lens on an emission side of a light-emitting diode (LED).

As described below, a light-emitting diode (LED) configured to emit light that is spread to a certain degree is preferably used in the case where light is emitted from the lens surfaces of the fly's-eye lens 10 with a certain half-angle of emission, but a laser diode (LD) with high directivity of light can be used according to the intended use. Also, a light source in which a laser diode (LD) is combined with a reflection surface or optical member for spreading light may be used.

In FIG. 3, collimated light is emitted from the light source 20 into the fly's-eye lens 10, and light spread to a certain degree is emitted from the lens surfaces of the fly's-eye lens 10 and is irradiated to the surface to be irradiated. The lens surfaces of the fly's-eye lens 10 may be located on a light source 20 side or on the emission side opposite to the light source 20 side. The surface opposite to the lens surfaces is preferably flat, but this is not limited thereto. In the case where the mounting surface of the fly's-eye lens 10 does not have the lens surfaces, particularly is a flat surface, the light source device 40 can be efficiently arranged to have good optical efficiency.

FIG. 3 shows a wall 30A having the surface 32A to be irradiated disposed perpendicular to the optical axis of emitted light, and a wall 30B having the surface 32B to be irradiated inclined at an angle $\theta$ to a plane perpendicular to the optical axis of emitted light. In other words, the wall 30B has the surface 32B to be irradiated that is positioned such that the normal of the surface 32B is inclined at the angle $\theta$ with respect to the optical axis of emitted light.

FIG. 4A shows the shape of the illuminated area 34A when light is irradiated to the surface 32A to be irradiated disposed perpendicularly to the optical axis of the light. FIG. 4A shows the shape of the illuminated area 34B when light is irradiated the surface 32B to be irradiated that is inclined at the angle $\theta$.

Figure 8A:
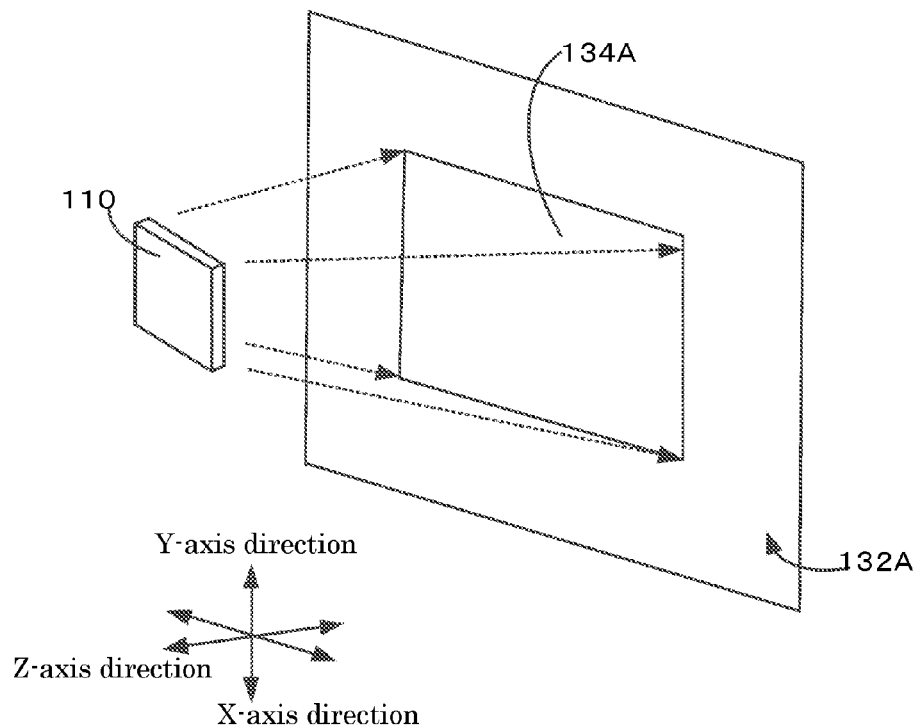
FIG. 8A is a schematic perspective view for illustrating the shape of an illuminated area when light is irradiated from a conventional light source device to a surface disposed perpendicular to the optical axis of the light.

FIG. 8A is a schematic perspective view for illustrating the shape of an illuminated area 134A when light is irradiated from a conventional front-irradiation light source device 140 to a surface 132A to be irradiated disposed perpendicular to the optical axis of the light.

Figure 8B:
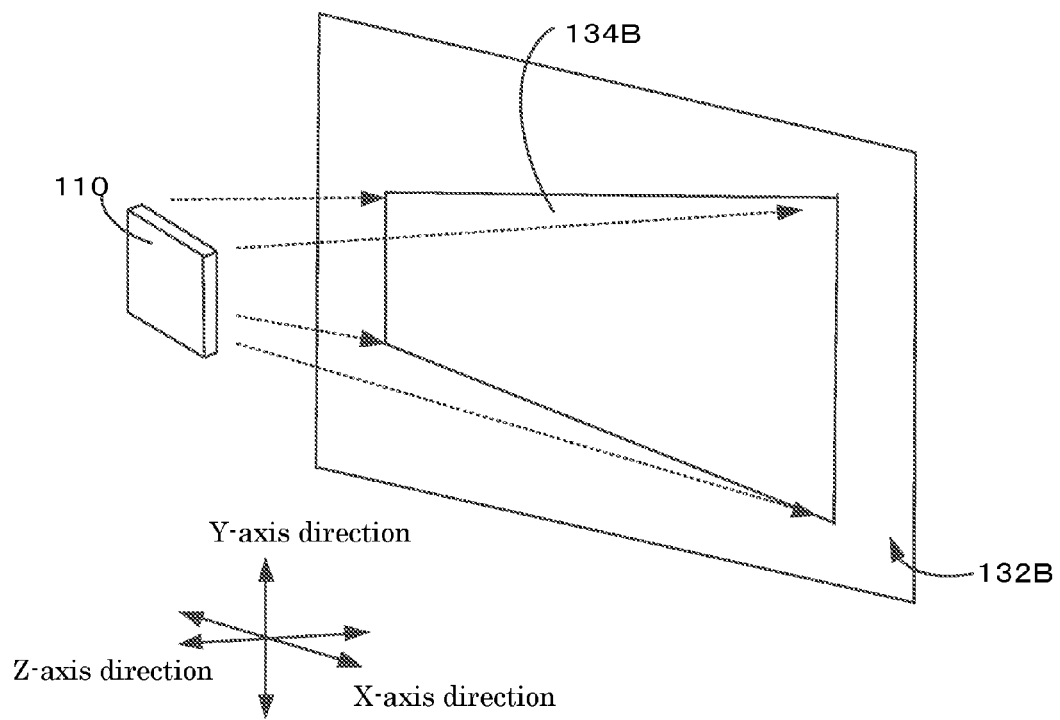
FIG. 8B is a schematic perspective view for illustrating the shape of an illuminated area when light is irradiated from the conventional light source device to a surface inclined with respect to the optical axis of the light.

FIG. 8B is a schematic perspective view for illustrating the shape of an illuminated area 134B when light is irradiated to the surface 132B to be irradiated inclined with respect to the optical axis of the light. FIG. 8A and FIG. 8B each show only a fly's-eye lens 110 included in the light source device and the surfaces to be irradiated 132A or 132B to be irradiated.

The conventional light source device shown in FIG. 8A and FIG. 8B is a front-irradiation device, so that the illuminated area 134A has a rectangular shape, and the luminance in the illuminated area 134A is uniform when light is irradiated to the surface 132A to be irradiated disposed perpendicular to the optical axis of the light.

On the other hand, when light is irradiated to the surface 32B to be irradiated that is inclined with respect to the optical axis of the light, the light travels from the fly's-eye lens 110 while spreading, which allows the side of the illuminated area 134B closer to the fly's-eye lens 110 to have a greater length and allows another side of the illuminated area 134B farther from the fly's-eye lens 110 to have a shorter length, so that the illuminated area 134B has a trapezoidal shape as shown in FIG. 8B.

If the illuminated area 134B has the trapezoidal shape as shown in FIG. 8B, a portion of the trapezoidal shape closer the side with the greater length has a larger area and thus has a lower luminance, which is light intensity per unit area, and a portion of the trapezoidal shape closer to the side with the shorter length has a smaller area and thus has a higher luminance. Accordingly, brightness of the illuminated area is greater at a portion nearer the fly's-eye lens 110, and is gradually decreased as distance from the fly's-eye lens 110 is increased, so that irradiation with uniform luminance may not be obtained. For example, it is difficult to apply this light source device for illuminating a billboard in an oblique direction because, with this light source device, an area intended to be illuminated does not correspond to the illuminated area, and the luminance in the illuminated area is not uniform.

On the other hand, in the present embodiment, in the case where light is irradiated on the surface 32A to be irradiated disposed perpendicular to the optical axis of the light, a side of illuminated area 34A corresponding to the first end 4 side of the fly's-eye lens 10, at which each of the lens surfaces has a smaller curvature (i.e., larger radius of curvature Ryz1), has a smaller length, and a side of illuminated area 34A corresponding to the second end 6 side of the fly's-eye lens 10, at which each of the lens surfaces has a large curvature (i.e., smaller radius of curvature Ryz2), has a greater length, as shown in FIG. 4A. With the curvature (radius of curvature Ryz) changed proportionately with respect to increase in the distance x from the first end 4 in the first direction (X-axis direction) as described above, the illuminated area 34A has a trapezoidal shape defined by the long side and the short side and straight lines connecting the long side and the short side.

The luminance of light irradiated the surface 32A to be irradiated is the highest at the first end 4 side, decreases toward the second end 6 side, and is the lowest at the second end 6. That is, a gradation of luminance is obtained.

The curvature (i.e., radius of curvature Ryz) may be changed according to any function of the distance x from the first end 4 in the first direction (X-axis direction), which is a variable, the shape may be defined by a long side, a short side, and a curved line corresponding to the function and connecting the long side and the short side. Because the luminance is also changed in accordance with the function, the gradation of luminance corresponding to the function can be obtained in this case.

On the other hand, when light is irradiated on the surface 32B to be irradiated that is inclined at the angle $\theta$ with respect to a plane perpendicular to the optical axis of the light (i.e., the normal of which is inclined at the angle $\theta$ with respect to the optical axis of outgoing light), the illuminated area 34B has a substantially rectangular shape in which a side at the first end 4 side has substantially the same length as the side at the second end 6 side as shown in FIG. 4B. The expression "rectangular shape" includes a square shape. The luminance of light in the illuminated area 34B is substantially uniform.

That is, with the lens surfaces of the fly's-eye lens 10 each having an appropriate curvature corresponding to the inclination angle $\theta$ at the first end 4 and the second end 6, the illuminated area 34B can have an optimum shape in the case where the fly's-eye lens 10 is arranged at the inclination angle $\theta$.

With this structure, in the case where, for example, the light source device 40 is used to illuminate a billboard from a slant direction, the area intended to be illuminated can coincide with the illuminated area 34B, and the illuminated area 34B can have a substantially uniform luminance, so that a good irradiation system for billboards can be provided.

Figure 5:
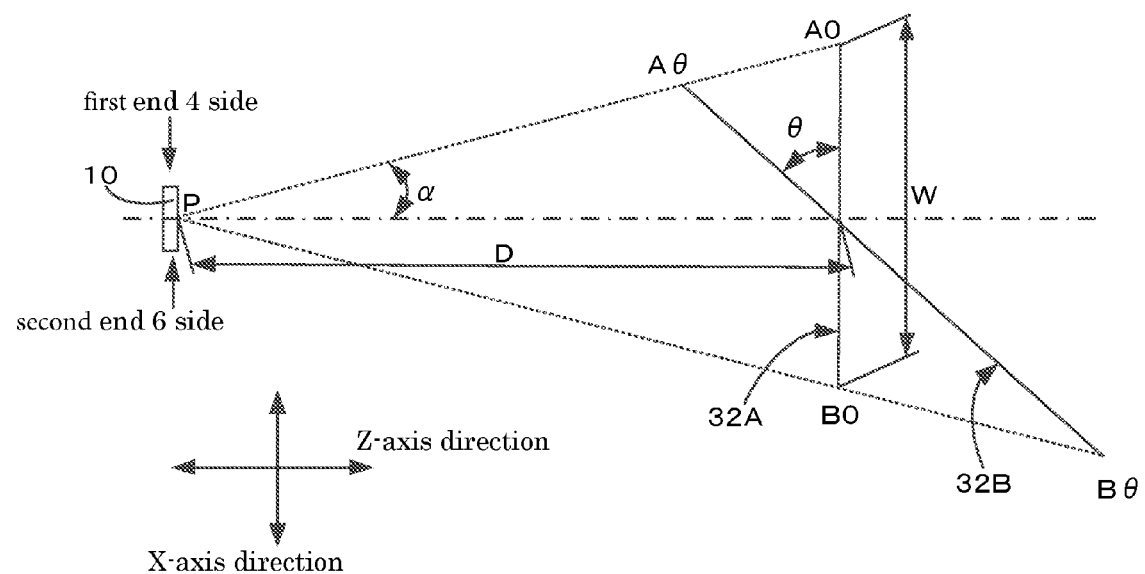
FIG. 5 is a schematic diagram on the X-Z plane illustrating the case where light is irradiated on a surface to be irradiated at a half-angle α from the fly's-eye lens.

Next, referring to FIG. 5, how to determine the curvature of each of the lens surfaces of the fly's-eye lens 10 for irradiating light on the surface 32B to be irradiated inclined at the angle $\theta$ with respect to a plane perpendicular to the optical axis of the light. FIG. 5 is a schematic diagram the X-Z plane illustrating the case where light is irradiated on the surfaces to be irradiated at a half-angle α of irradiation from the fly's-eye lens 10. The expression "half-angle α of irradiation" refers to an angle that is a half of a divergence angle of irradiation.

In the present specification, light is assumed to be emitted from a center point P of the fly's-eye lens 10 at the half-angle α of irradiation. Also in the Y-axis direction, which is perpendicular to a direction in which FIG. 5 is viewed, the light advances while spreading from the center point P of the fly's-eye lens 10 at the half-angle α of irradiation.

The curvature of each of the lens surfaces of the fly's-eye lens 10 is determined as follows. First, the value of the half-angle α of irradiation is determined by a width dimension W of the surface 32A to be irradiated and a distance D between the fly's-eye lens 10 and the surface 32A to be irradiated. That is, the value of α is determined to satisfy W=2×D×sin α.

Subsequently, the curvature (see the radius of curvature Rxz in FIG. 2) of each of the lens surfaces in the first direction (i.e., X-axis direction) is determined so that light is emitted from the fly's-eye lens 10 at the half-angle α of irradiation, and then the curvature (see the radius of curvature Ryz in FIG. 2) of the lens surfaces in the second direction (i.e., Y-axis direction) is determined while the curvature (i.e., radius Rxz) in the first direction (i.e., X-axis direction) is kept to be a predetermined value.

Here, intersection points of lines each indicating light traveling from the center point P of the fly's-eye lens 10 at the half-angle α of irradiation and a line indicating the surface 32A to be irradiated disposed perpendicular to the optical axis of the light are referred to as A0 and B0. That is, the intersection points A0 and B0 correspond to both ends of the illuminated area 34A when light is irradiated on the surface 32A to be irradiated disposed perpendicular to the optical axis of the light.

Similarly, intersection points of lines that each indicate light traveling from the center point P of the fly's-eye lens 10 at the half-angle α of irradiation and a line indicating the surface 32B to be irradiated that is inclined at the angle θ with respect to a plane perpendicular to the optical axis of the light are referred to as A0 and B0. That is, the intersection points A0 and B0 correspond to both ends of the illuminated area 34B when is irradiated to the surface 32B to be irradiated that is inclined with respect to the optical axis of the light.

Accordingly, a length $D_{PA0}$ of the side P-A0, a length $D_{PB0}$ of the side P-B0, a length $D_{PA\theta}$ of the side P-Aθ, and a length $D_{PB\theta}$ of the side P-Bθ are determined. Thus, the length of the side of the illuminated area 34A in the Y-axis direction at the end point A0, the length of the side of the illuminated area 34A in the Y-axis direction at the end point B0, the length of the side of the illuminated area 34A in the Y-axis direction at the end A0, and the length of the side of the illuminated area 34A in the Y-axis direction at the end B0 are determined.

For example, the length of the side in the Y-axis direction at the point Aθ is smaller than the length of the side in the Y-axis direction at the point A0 by a value of $2\times(D_{PA0}-D_{PA\theta})\times\tan\alpha$.

The length of the side in the Y-axis direction at the point Bθ is greater than the length of the side in the Y-axis direction at the point B0 by a value of $2\times(D_{PB\theta}-D_{PB0})\times\tan\alpha$.

Thus, the length of each of the sides of the illuminated area 34A in the surface 32A to be irradiated, which is arranged perpendicular to the optical axis of emitted light, in the Y-axis direction at both ends A0 and B0 (that is, the shape of the trapezoidal illuminated area,) can be determined so that the sides of the illuminated area 34B in the surface 32B to be irradiated, which is inclined with respect to the optical axis of the emitted light in the Y-axis direction at both ends A0 and B0 have the same length (that is, so that an rectangular illuminated area is formed).

Subsequently, the curvature (see the radius of curvature Ryz) of the lens surfaces in the second direction (i.e., Y-axis direction) is determined so that the shape of the above illuminated area is determined. More specifically, the radius of curvature Ryz1 at the first end 4 in the first direction (i.e., X-axis direction) and the radius of curvature Ryz2 at the second end 6 are determined. The radius of curvature Ryz between the first end 4 and the second end 6 is then determined so that the radius of curvature Ryz is changed continuously (see FIG. 2).

At this time, the radius of curvature Ryz is adjusted as appropriate so that the radius of curvature Rxz in the first direction (i.e., X-axis direction) allows light to be emitted at the half-angle α of irradiation.

Luminances TAθ and TBθ at both ends Aθ and Bθ, respectively, of the illuminated area 34B in the surface 32B to be irradiated that is inclined with respect to the optical axis of emitted light when the light is emitted from the light fly's-eye lens 10 at the half-angle α of irradiation are calculated.

The table below shows TAθ/TBθ, which is the ratio of the luminance at the end Aθ with respect to the luminance at the end Bθ. In the table below, the case where a half-angle α of irradiation is 14° (i.e., divergence angle of irradiation is 28°) and the case where that is 26.5° (i.e., divergence angle of irradiation is 53°) are shown here.

TABLE 1

| Inclination angle θ | TAθ/TBθ (where α = 14°) | TAθ/TBθ (where α = 26.5°) |
|---|---|---|
| 0° | 1 | 1 |
| 10° | 1.2 | 1.4 |
| 20° | 1.3 | 2.1 |
| 26.5° | 1.4 | 2.8 |
| 30° | 1.5 | 3.3 |
| 40° | 2.3 | 6.0 |
| 50° | 3.4 | 15.6 |

A luminance is a light intensity per unit area, and thus is in inverse proportion to the area of the illuminated area. Because the light at the half-angle α of irradiation travels while spreading not only in the X-axis direction but also in the Y-axis direction, a luminance is in inverse proportion to the square of the length of a side. When the curvatures of the lens surfaces 2 of the fly's-eye lens 10 are actually determined, the difference in the curvatures between the first end 4 and the second end 6 is greatly large in the case where the ratio of the lengths of the sides of the illuminated area at both ends is greater than two. Accordingly, it is preferable that the ratio of the lengths of the sides of the illuminated area at both ends be two or smaller, that is, the ratio TAθ/TBθ of the luminance at both ends be four or smaller.

In the cases shown in Table 1 above, even an inclination angle θ of 50° is applicable in the case where a half-angle α of irradiation is 14°, but an inclination angle θ of up to an angle a little larger than 30° is preferably applied in the case where a half-angle α of irradiation is 26.5°.

As described above, as shown in FIG. 2, the optical member according to the present embodiment includes at least one lens surface 2 having the curved surface with the curvature in the first direction (i.e., X-axis direction) and the curvature in the second direction (Y-axis direction). The first direction and the second direction is perpendicular to each other on an imaginary plane perpendicular to the optical axis of incident light. The lens surface has a substantially rectangular planar shape when viewed in the optical axis direction, and the substantially rectangular planar shape is defined by two sides substantially parallel to the first direction (i.e., X-axis direction) and two sides substantially parallel to the second direction (i.e., Y-axis direction). The curvature in the second direction (i.e., Y-axis direction) continuously increases from the first end 4 toward the second end 6 of the lens surface 2 in the first direction (i.e., X-axis direction).

Alternatively, the optical member may have one lens surface 2, or the fly's-eye lens 10 may include a plurality of lens surfaces 2 in the same orientation arranged in a matrix.

In any of these cases, as shown in FIG. 4B, when light is irradiated to the surface 32B to be irradiated, the rectangular illuminated area 34B with a substantially uniform luminance can be provided in the surface 32B to be irradiated that is inclined with respect to the optical axis of the light.

In addition, in each of portions of the fly's-eye lens 10 respectively having a lens surface 10, as shown in FIG. 2, a spline curve or a Bézier curve can be formed with the curvature in the first direction (i.e., X-axis direction), a curve that is a portion of an ellipse can be formed with the curvature in the second direction (i.e., Y-axis direction) at the first end 4, and a curve that is a portion of a circle can be formed with the curvature in the second direction (i.e., Y-axis direction) at the second end 6.

With this configuration, when light is irradiated to the surface 32B to be irradiated that is inclined with respect to the optical axis of the light, a simple lens surfaces 2 that allows illumination of a substantially rectangular shape in the surface 32B to be irradiated with a substantially uniform luminance can be efficiently obtained.

As shown in FIG. 3, the light source device 40 including such an optical member 10 and the light source 20 configured to irradiate collimated light to the optical member 10 can give the illuminated area 34B of a substantially rectangular shape with a substantially uniform illuminance on the surface 32B to be irradiated.

Irradiation System According to One Embodiment of Present Invention

Figure 6A:
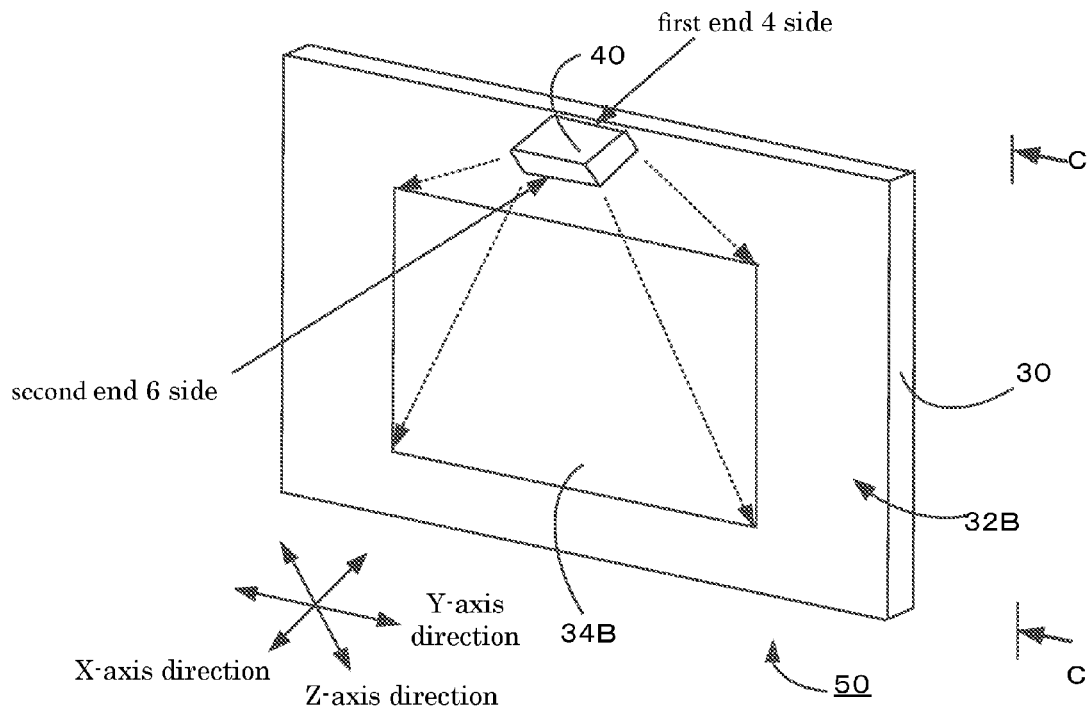
FIG. 6A is a schematic perspective view of an irradiation system according to one embodiment including the light source device shown in FIG. 3.
Figure 6B:
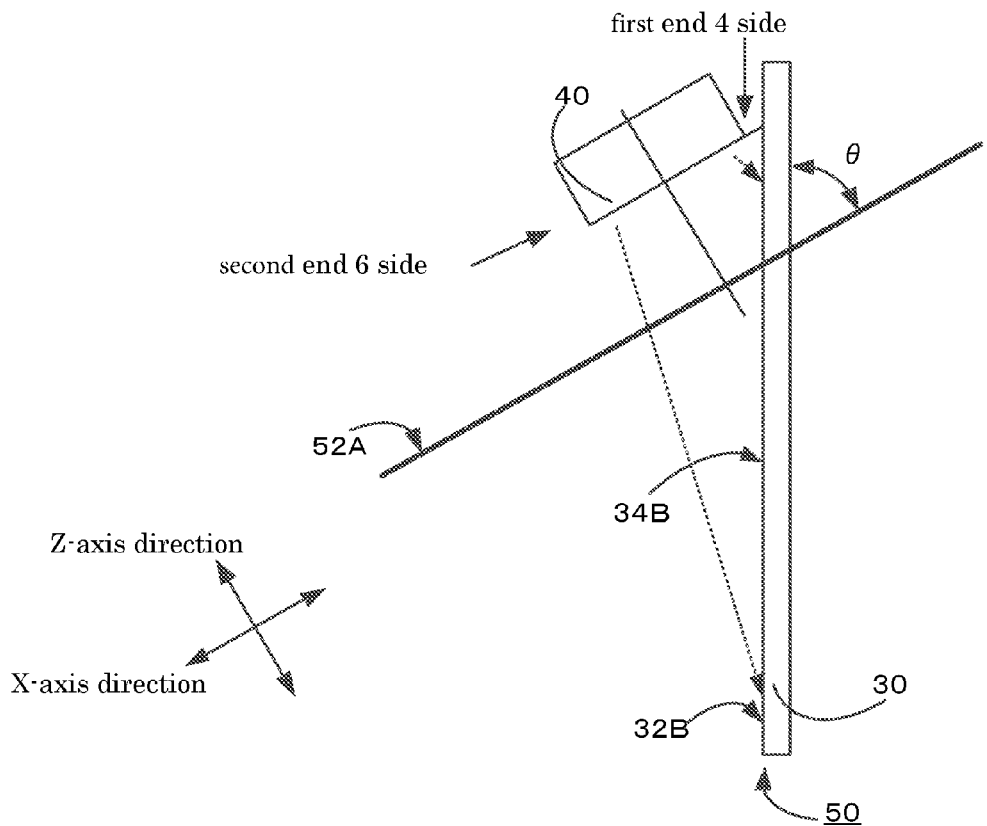
FIG. 6B is a schematic side view from a direction indicated by arrows C-C in FIG. 6A.

An irradiation system according to one embodiment of the present invention will be described referring to FIG. 6A and FIG. 6B. FIG. 6A is a schematic perspective view of an irradiation system 50 according to the embodiment including the light source device 40 shown in FIG. 3. FIG. 6B is a schematic side view when viewed in the direction of the arrows C-C in FIG. 6A.

The irradiation system 50 according to the present embodiment includes the light source device 40 and a billboard 30 that is a wall having the surface 32B to be irradiated with light from the light source device 40. The light source device 40 is attached to the upper side of the billboard 30 and illuminates the surface 32B to be irradiated of the billboard 30 from obliquely above.

More specifically, the surface 32B to be irradiated of the billboard 30 is inclined at the angle θ with respect to a plane perpendicular to emitted light from the light source device 40 as shown in FIG. 6B. In view of the first end 4 and the second end 6 in the first direction (X-axis direction) of each lens surface of the fly's-eye lens 10 included in the light source device 40 as shown in FIG. 2, the light source device 40 is attached to the billboard 30 such that the first end 4 side of the surface 32B to be irradiated is closer to the light source device 40, and the second end 6 side of the surface 32B to be irradiated is farther from the light source device 40.

With this structure, as shown in FIG. 6A, the rectangular illuminated area 34B with a uniform illuminance can be obtained on the surface 32B to be irradiated of the billboard 30.

Irradiation System According to Another Embodiment of Present Invention

Figure 7A:
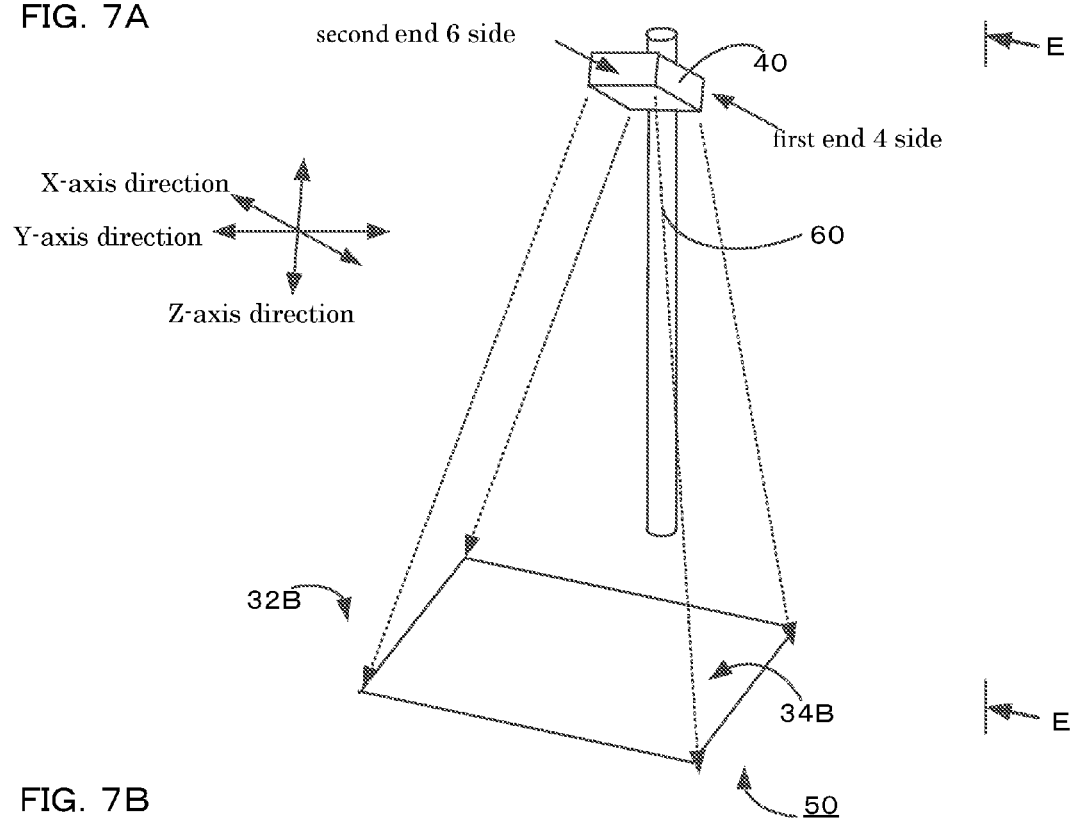
FIG. 7A is a schematic perspective view of an irradiation system according to another embodiment including the light source device shown in FIG. 3.
Figure 7B:
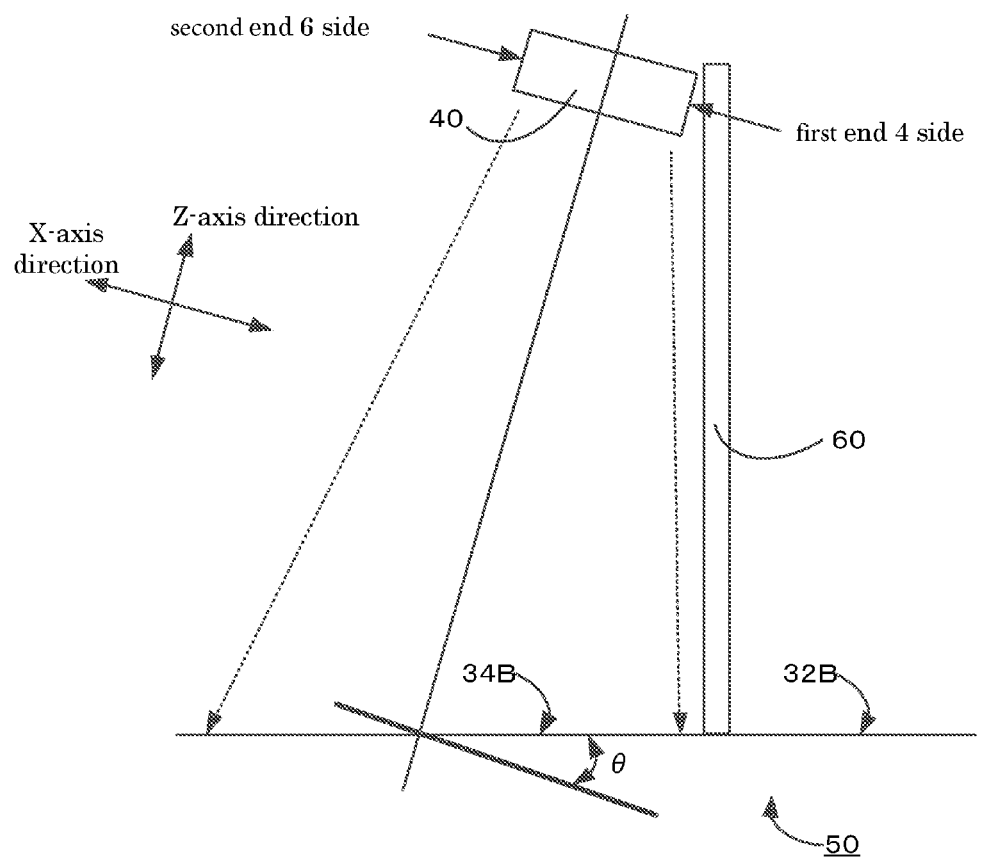
FIG. 7B is a schematic side view from a direction indicated by arrows E-E in FIG. 7A.

An irradiation system according to another embodiment of the present invention will be described referring to FIG. 7A and FIG. 7B. FIG. 7A is a schematic perspective view of an irradiation system 50 according to another embodiment including the light source device 40 shown in FIG. 3. FIG. 7B is a schematic side view when viewed in the direction indicated by the arrows E-E in FIG. 7A.

In the irradiation system 50 according to the present embodiment, the light source device 40 is attached to an upper portion of a pole 60 disposed on a side portion of a road, and configured to illuminate the road from obliquely above. That is, the irradiation system 50 includes a surface 32B to be irradiated, which is a portion of a surface of the road and to be irradiated with light from the light source device 40.

More specifically, the surface 32B to be irradiated on the road is inclined at an angle θ with respect to a plane perpendicular to light emitted from the light source device 40 as shown in FIG. 7B. In view of the first end 4 and the second end 6 in the first direction (X-axis direction) of each lens surface of the fly's-eye lens included in the light source device 40 as shown in FIG. 2, the light source device 40 is attached to the pole 60 such that the first end 4 side of the surface 32B to be irradiated is closer to the light source device 40 and the second end 6 side of the surface 32B to be irradiated is farther from the light source device 40.

This structure allows for obtaining a substantially rectangular illuminated area 34B with a substantially uniform illuminance on the surface 32B to be irradiated of the road as shown in FIG. 7A.

In both of the irradiation system according to one embodiment and the irradiation system according to another embodiment of the present invention, the rectangular illuminated area 34B with a uniform illuminance can be obtained on the surface 32B to be irradiated that is inclined at the angle θ with respect to a plane perpendicular to light emitted from the light source device 40.

In the description above, the irradiation system configured to irradiate light to a billboard in a slant direction and the irradiation system configured to illuminate a road in a slant direction are illustrated as examples, but any other appropriate irradiation systems configured to illuminate surfaces to be irradiated in a slant direction, including systems used for projection display devices, are also included in the scope of the present invention.

Certain embodiments of the present invention have been described above, but details of the constitutions described above may be changed. Combinations of elements and changes in orders in the embodiments can be realized without deviating from the scope of the claims and idea of the present invention.

What is claimed is:
1. An optical member comprising:
one or more lens surfaces, each lens surface comprising a curved surface having:
a curvature in a first direction, and a curvature in a second direction that is perpendicular to the first direction in an imaginary plane perpendicular to an optical axis of incident light, wherein each of the one or more lens surfaces has a substantially rectangular planar shape when viewed in an optical axis direction, the substantially rectangular planar shape being defined by two sides substantially parallel to the first direction and two sides substantially parallel to the second direction, and wherein the curvature in the second direction continuously increases from a first end of each of the one or more lens surfaces in the first direction toward a second end of each of the one or more lens surfaces in the first direction.

2. The optical member according to claim 1, wherein:
the curvature in the first direction comprises a spline curve or a Bézier curve,
the curvature in the second direction comprises a curve that is a portion of an ellipse at the first end of each of the one or more lens surfaces in the first direction, and a curve that is a portion of a circle at the second end of each of the one or more lens surfaces in the first direction.

3. The optical member according to claim 2,
wherein the one or more lens surfaces comprise a plurality of the lens surfaces that are arranged in a matrix and oriented in the same direction.

4. A light source device comprising:
the optical member according to claim 3; and
a light source configured to irradiate collimated light on the optical member.

5. An irradiation system comprising:
the light source device according to claim 4; and
an inclined surface positioned to be irradiated with light emitted from the light source device,
wherein the inclined surface is inclined with respect to an imaginary plane perpendicular to light emitted from the light source device such that a first end of the inclined surface that is closer to the first end of each of the one or more lens surfaces in the first direction is located closer to the light source device and a second end of the inclined surface that is closer to the second end of each of the one or more lens surfaces in the first direction is located farther from the light source device.

6. A light source device comprising:
the optical member according to claim 2; and
a light source configured to irradiate collimated light on the optical member.

7. An irradiation system comprising:
the light source device according to claim 6; and
an inclined surface positioned to be irradiated with light emitted from the light source device,
wherein the inclined surface is inclined with respect to an imaginary plane perpendicular to light emitted from the light source device such that a first end of the inclined surface that is closer to the first end of each of the one or more lens surfaces in the first direction is located closer to the light source device and a second end of the inclined surface that is closer to the second end of each of the one or more lens surfaces in the first direction is located farther from the light source device.

8. The optical member according to claim 1,
wherein the one or more lens surfaces comprise a plurality of the lens surfaces that are arranged in a matrix and oriented in the same direction.

9. A light source device comprising:
the optical member according to claim 8; and
a light source configured to irradiate collimated light on the optical member.

10. An irradiation system comprising:
the light source device according to claim 9; and
an inclined surface positioned to be irradiated with light emitted from the light source device,
wherein the inclined surface is inclined with respect to an imaginary plane perpendicular to light emitted from the light source device such that a first end of the inclined surface that is closer to the first end of each of the one or more lens surfaces in the first direction is located closer to the light source device and a second end of the inclined surface that is closer to the second end of each of the one or more lens surfaces in the first direction is located farther from the light source device.

11. A light source device comprising:
the optical member according to claim 1; and
a light source configured to irradiate collimated light on the optical member.

12. An irradiation system comprising:
the light source device according to claim 11; and
an inclined surface positioned to be irradiated with light emitted from the light source device,
wherein the inclined surface is inclined with respect to an imaginary plane perpendicular to light emitted from the light source device such that a first end of the inclined surface that is closer to the first end of each of the one or more lens surfaces in the first direction is located closer to the light source device and a second end of the inclined surface that is closer to the second end of each of the one or more lens surfaces in the first direction is located farther from the light source device.

* * * * *